(12) United States Patent
Laaksonen et al.

(10) Patent No.: US 11,636,644 B2
(45) Date of Patent: Apr. 25, 2023

(54) OUTPUT OF VIRTUAL CONTENT

(71) Applicant: Nokia Technologies Oy, Espoo (FI)

(72) Inventors: Lasse Juhani Laaksonen, Tampere (FI); Jussi Artturi Leppänen, Tampere (FI); Arto Juhani Lehtiniemi, Lempäälä (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 22 days.

(21) Appl. No.: 17/329,983

(22) Filed: May 25, 2021

(65) Prior Publication Data
US 2021/0390765 A1 Dec. 16, 2021

(30) Foreign Application Priority Data
Jun. 15, 2020 (EP) ..................................... 20179883

(51) Int. Cl.
*G06T 15/20* (2011.01)
*G06T 7/73* (2017.01)
(Continued)

(52) U.S. Cl.
CPC ............ *G06T 15/20* (2013.01); *G02B 27/017* (2013.01); *G06T 7/73* (2017.01); *G06T 19/006* (2013.01);
(Continued)

(58) Field of Classification Search
CPC ......... G06T 15/20; G06T 7/73; G06T 19/006; G06T 2215/16; G06V 20/20; G02B 2027/014
See application file for complete search history.

(56) References Cited

U.S. PATENT DOCUMENTS

| 8,347,228 B1 * | 1/2013 | Kates | G06F 3/0482 |
| | | | 345/9 |
| 8,402,054 B2 * | 3/2013 | Frazier | G06F 16/437 |
| | | | 707/780 |

(Continued)

FOREIGN PATENT DOCUMENTS

| DE | 102017009121 A1 * | 6/2018 | ........... G06T 19/006 |
| EP | 3084563 A1 | 10/2016 | |

(Continued)

OTHER PUBLICATIONS

Extended European Search Report received for corresponding European Patent Application No. 20179883.2, dated Nov. 12, 2020, 10 pages.

*Primary Examiner* — Ryan R Yang
(74) *Attorney, Agent, or Firm* — Alston & Bird LLP

(57) ABSTRACT

This specification describes an apparatus, method and computer program relating to virtual reality, particularly augmented reality (AR) or mixed reality (MR). The method may comprise providing, based on a position associated with a display means, different first and second sets of virtual content for overlaid display at the display means at a first time and determining that the first set of virtual content is prioritized over the second set of virtual content. Based on the determination, the method may comprise prioritizing display of the first set of virtual content over the second set of virtual content at the display means, and enabling display of the second set of virtual content at a second, subsequent, time.

20 Claims, 8 Drawing Sheets

(51) Int. Cl.
*G02B 27/01* (2006.01)
*G06T 19/00* (2011.01)
*G06V 20/20* (2022.01)

(52) U.S. Cl.
CPC ........ *G06V 20/20* (2022.01); *G02B 2027/014* (2013.01); *G06T 2215/16* (2013.01)

(56) References Cited

U.S. PATENT DOCUMENTS

| | | | | |
|---|---|---|---|---|
| 9,633,375 | B2* | 4/2017 | Krishnamurthy | H04L 67/02 |
| 10,296,537 | B1* | 5/2019 | Waltereze | G06V 20/64 |
| 10,565,761 | B2* | 2/2020 | DeLuca | G06F 3/013 |
| 10,885,312 | B2* | 1/2021 | Hamada | H04N 7/18 |
| 11,107,282 | B1* | 8/2021 | Boissière | G06F 3/011 |
| 2014/0168262 | A1* | 6/2014 | Forutanpour | G06T 19/006 |
| | | | | 345/633 |
| 2015/0169047 | A1 | 6/2015 | Reponen | |
| 2015/0206343 | A1* | 7/2015 | Mattila | G06T 17/05 |
| | | | | 345/420 |
| 2016/0042563 | A1* | 2/2016 | Ur | G06T 11/00 |
| | | | | 345/633 |
| 2016/0093106 | A1 | 3/2016 | Black | |
| 2019/0317718 | A1* | 10/2019 | George | G06F 3/04815 |

FOREIGN PATENT DOCUMENTS

| | | | |
|---|---|---|---|
| WO | 2015/092120 A1 | 6/2015 | |
| WO | WO 2018148076 A1 * | 8/2018 | |
| WO | 2018/217470 A1 | 11/2018 | |

* cited by examiner

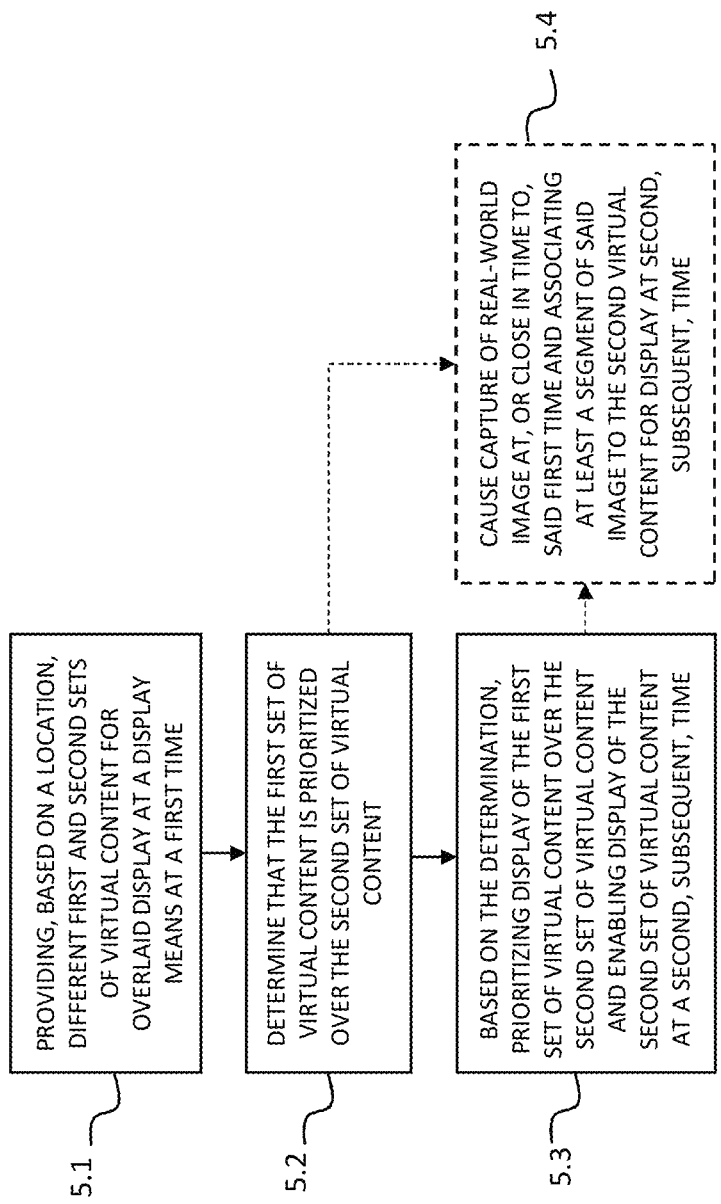

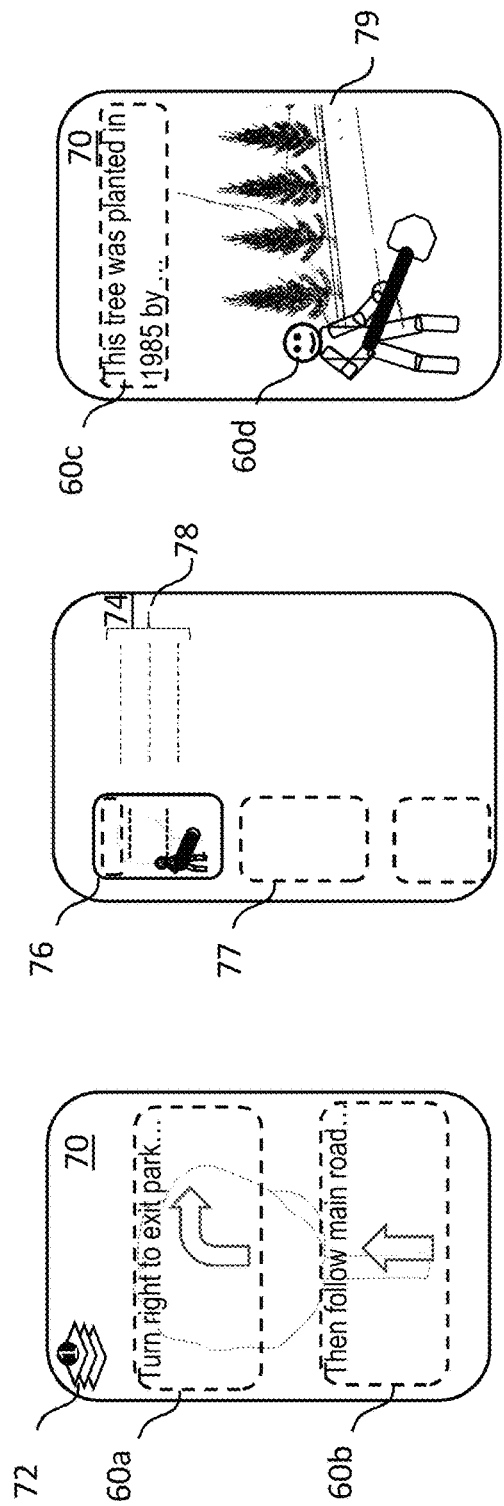

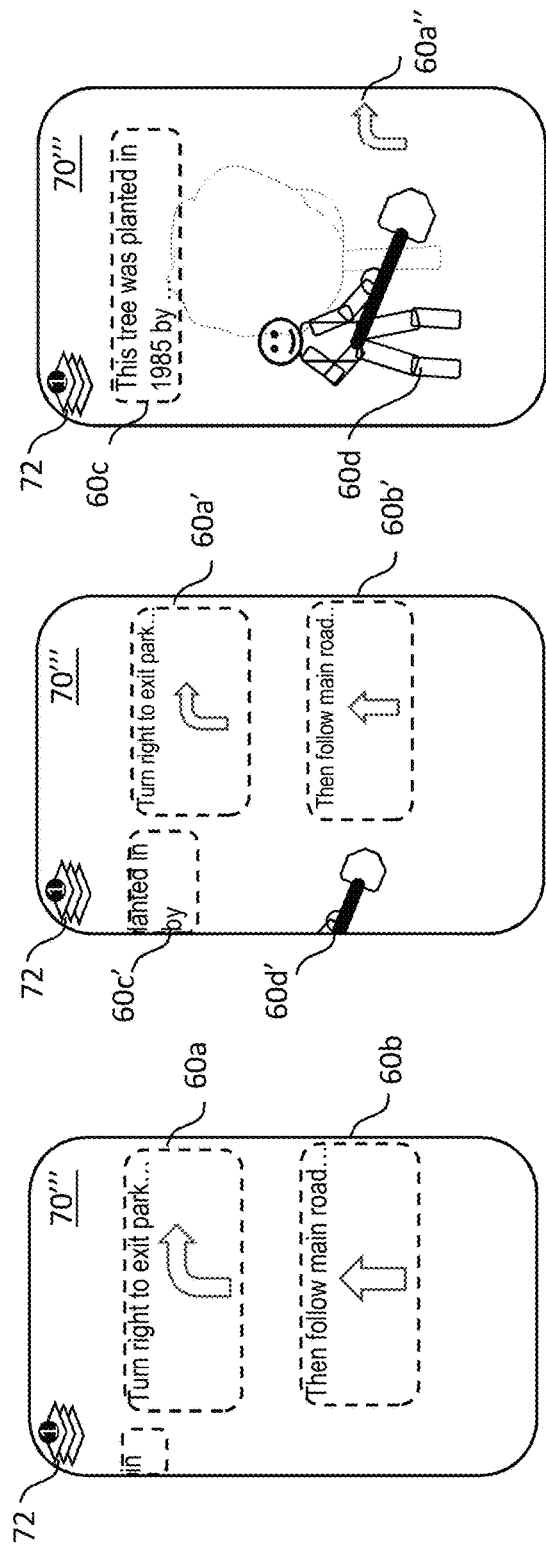

OUTPUT OF VIRTUAL CONTENT

FIELD

Example embodiments relate to the field of outputting virtual content, for example the display of augmented reality (AR) or mixed reality (MR) content. Example embodiments also relate to associated methods, computer programs and apparatuses.

BACKGROUND

The term extended reality (XR) is sometimes used to refer to a range of technologies and methods involving real and virtual combined environments. Common examples are virtual reality (VR), augmented reality (AR) and mixed reality (MR). VR may refer to rendering a virtual scene in terms of video and/or audio content, through a VR headset or handheld device, wherein the virtual scene may be updated based on user movement. AR is similar, but involves output of overlaid virtual content to augment a view of the real world seen through glasses, goggles or the camera of a handheld device. Thus, a user of an AR display means may be able to view the real-world environment around them, augmented or supplemented with content that may be provided based on their position. The virtual content may comprise multimedia content such as pictures, photographs, video, diagrams, textual information, and aural content, to give some examples. An example use case is navigation instructions. MR is similar to AR, but may be considered more advanced in that some content is inserted into the real scene at anchor points to give the illusion that the content is part of the real scene.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, this specification describes an apparatus comprising means for: providing, based on a position associated with a display means, different first and second sets of virtual content for overlaid display at the display means at a first time; determining that the first set of virtual content is prioritized over the second set of virtual content; based on the determination: prioritizing display of the first set of virtual content over the second set of virtual content at the display means; and enabling display of the second set of virtual content at a second, subsequent, time.

The means may be configured to prioritize display by causing display of the first set of virtual content at the display means, and not the second set of virtual content.

The means may be configured to determine that the first set of virtual content is prioritized over the second set of virtual content if the first set of virtual content is being displayed prior to said first time (and, for example, if the second set of virtual content is not being displayed prior to said first time).

The means may be configured to determine that the first set of virtual content is prioritized over the second set of virtual content if the first and second sets of virtual content will conflict if both are displayed at the first time.

The means may be configured to identify that the first and second sets of virtual content will conflict if their respective positions will be within a predetermined distance of one another or will overlap.

The means may be configured to enable display of the second set of virtual content automatically, responsive to the first set of virtual content no longer being displayed.

The means may be configured to enable display of the second set of virtual content responsive to receiving a user-selection of the second set of virtual content.

The means may be further configured to cause capture, by a camera associated with the display means, of a real-world image at, or close in time to (e.g. within a predefined time period), said first time, and to associate at least a segment of the captured image with the second virtual content for display of said captured image segment with the second virtual content at said second time. The means may be further configured to provide metadata associated with said image segment defining how the captured image segment is to be displayed when displayed at the display means. Subsequent to the first time, the means may be further configured to determine a similarity between said captured image segment, and part of a current or recent (e.g. substantially current, such as within a defined time period) real-world image captured by the camera, and to cause display of said captured image segment at the display means in response to determining a predetermined level of similarity. The means may be configured to cause display of said captured image segment such that it overlays the similar part of the real-world image. The means may be configured to identify that the similar part of the current or recent real-world image is outside of a predetermined display region of the display means, and responsive thereto, may provide one or more cues via the display means indicating a required camera movement to move said similar part of the current or recent real-world image towards the predetermined display region. The one or more cues may change appearance with movement of the camera to indicate progress towards the predetermined display region. The means may be configured to provide a modified form of the second set of virtual content and/or said captured image segment as the cue. The modified form may comprise a stretched form that un-stretches with movement of the camera to indicate progress towards the predetermined display region. The modified form may comprise a partial view that is displayed simultaneously with the first set of virtual content and which grows in size with movement of the camera to indicate progress towards the predetermined display region while reducing the size of the first set of virtual content. The means may be further configured to indicate at the display means the availability of the second set of virtual content for subsequent display. The means may be configured to provide a plurality of different second sets of virtual content and to display an indicator at the display means including an indication of the number of second sets of virtual content that can be subsequent displayed. The means may be configured, responsive to user selection associated with the indicator, to display a gallery view of the different second sets of virtual content, and to receive selection of the second set to display via the gallery view.

According to a second aspect, this specification describes a method, comprising: providing, based on a position associated with a display means, different first and second sets of virtual content for overlaid display at the display means at a first time; determining that the first set of virtual content is prioritized over the second set of virtual content; based on the determination: prioritizing display of the first set of virtual content over the second set of virtual content at the display means; and enabling display of the second set of virtual content at a second, subsequent, time.

The method may prioritize display by causing display of the first set of virtual content at the display means, and not the second set of virtual content.

The method may determine that the first set of virtual content is prioritized over the second set of virtual content if the first set of virtual content is being displayed prior to said first time.

The method may determine that the first set of virtual content is prioritized over the second set of virtual content if the first and second sets of virtual content will conflict if both are displayed at the first time.

The method may identify that the first and second sets of virtual content will conflict if their respective positions will be within a predetermined distance of one another or will overlap.

The method may enable display of the second set of virtual content automatically, responsive to the first set of virtual content no longer being displayed.

The method may enable display of the second set of virtual content responsive to receiving a user-selection of the second set of virtual content.

The method may further comprise causing capture, by a camera associated with the display means, of a real-world image at, or close in time to, said first time, and to associate at least a segment of the captured image with the second virtual content for display of said captured image segment with the second virtual content at said second time. The method may provide metadata associated with said image segment defining how the captured image segment is to be displayed when displayed at the display means. Subsequent to the first time, the method may determine a similarity between said captured image segment, and part of a current or recent real-world image captured by the camera, and to cause display of said captured image segment at the display means in response to determining a predetermined level of similarity. The method may cause display of said captured image segment such that it overlays the similar part of the real-world image. The method may identify that the similar part of the current or recent real-world image is outside of a predetermined display region of the display means, and responsive thereto, may provide one or more cues via the display means indicating a required camera movement to move said similar part of the current or recent real-world image towards the predetermined display region. The one or more cues may change appearance with movement of the camera to indicate progress towards the predetermined display region. The method may provide a modified form of the second set of virtual content and/or said captured image segment as the cue. The modified form may comprise a stretched form that un-stretches with movement of the camera to indicate progress towards the predetermined display region. The modified form may comprise a partial view that is displayed simultaneously with the first set of virtual content and which grows in size with movement of the camera to indicate progress towards the predetermined display region while reducing the size of the first set of virtual content. The method may indicate at the display means the availability of the second set of virtual content for subsequent display. The method may provide a plurality of different second sets of virtual content and to display an indicator at the display means including an indication of the number of second sets of virtual content that can be subsequent displayed. The method may, responsive to user selection associated with the indicator, display a gallery view of the different second sets of virtual content, and receive selection of the second set to display via the gallery view.

According to a third aspect, this specification describes a computer readable medium comprising computer program code stored thereon, the computer readable medium and computer program code being configured to, when run on at least one processor, perform the method of: providing, based on a position associated with a display means, different first and second sets of virtual content for overlaid display at the display means at a first time; determining that the first set of virtual content is prioritized over the second set of virtual content; based on the determination: prioritizing display of the first set of virtual content over the second set of virtual content at the display means; and enabling display of the second set of virtual content at a second, subsequent, time.

According to a fourth aspect, this specification describes a computer readable medium comprising computer program code stored thereon, the computer readable medium and computer program code being configured to, when run on at least one processor, perform the method of any operation related to the second aspect.

According to a fifth aspect, this specification describes an apparatus comprising: at least one processor; and at least one memory including computer program code which, when executed by the at least one processor, causes the apparatus to: provide, based on a position associated with a display means, different first and second sets of virtual content for overlaid display at the display means at a first time; determine that the first set of virtual content is prioritized over the second set of virtual content; based on the determination: prioritize display of the first set of virtual content over the second set of virtual content at the display means; and enable display of the second set of virtual content at a second, subsequent, time.

According to a sixth aspect, this specification describes an apparatus comprising: at least one processor; and at least one memory including computer program code which, when executed by the at least one processor, causes the apparatus to perform any operation related to the second aspect.

BRIEF DESCRIPTION OF THE FIGURES

Example embodiments will now be described, by way of example only, with reference to the accompanying drawings.

FIG. 5 is a flow diagram showing processing operations according to some example embodiments;

FIGS. 6a-6d are schematic views indicative of a user interface of a display means operating according to some example embodiments;

FIGS. 10a-10c are schematic views indicative of a user interface of a display means operating according to some example embodiments;

FIGS. 11a-11c are schematic views indicative of a user interface of a display means operating according to some example embodiments;

DETAILED DESCRIPTION

Example embodiments relate to methods, computer programs and apparatuses relating to extended reality (XR), for example augmented reality (AR) and/or mixed reality (MR).

For ease of explanation, the term augmented reality (AR) will be used hereinafter, but it should be understood that AR is intended also to cover MR and any related technology involving the output of virtual content overlaid onto part of a real-world scene.

Virtual content may comprise multimedia content such as pictures, photographs, video, diagrams, textual information, and aural content, to give some examples. The virtual content may be represented in any suitable data format. Example embodiments focus on visual content rather than aural content but the latter is not excluded. Virtual content may be generated from a captured scene, whether an entire scene or one or more segments of a scene, or may be generated by a designer using an appropriate content creation tool.

As mentioned, AR may use an AR display means, for example glasses or goggles having one or more transparent lenses within (or onto) which one or more images may be projected. Another form of AR display means may be a portable computing device such as a mobile phone or tablet having a camera to capture a viewport of the real world for display in the manner of a lens. An AR apparatus, which may or may not include the AR display means, may provide for presentation of the virtual content to be overlaid over the user's view of the real-world, whether it is seen through a transparent lens or through the camera. Thus, a user of AR may be able to view the real-world environment around them, which is augmented or supplemented with content provided a content provider. AR content may also include aural content.

Figure 1:
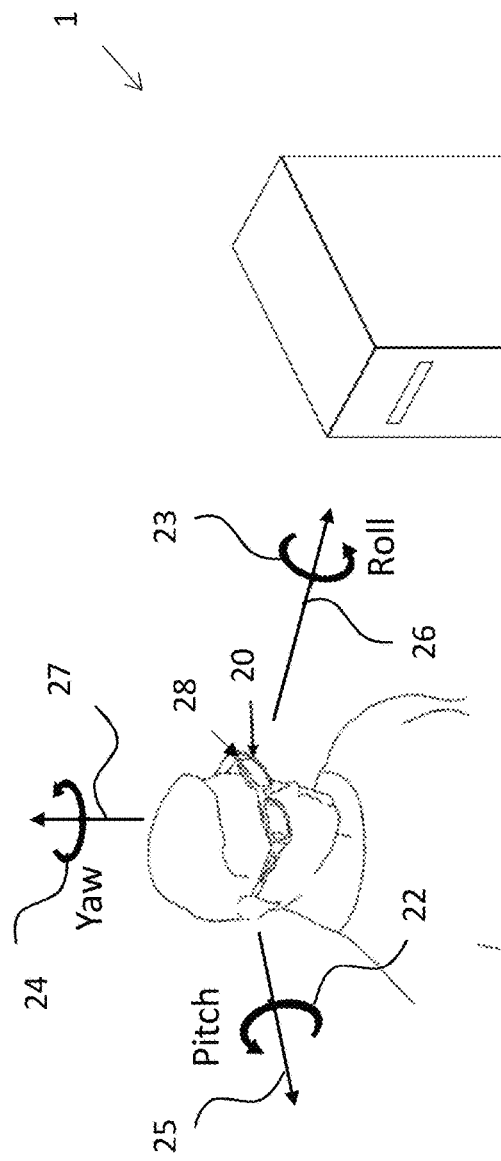
FIG. 1 is a schematic illustration of an example AR system which may represent user-end equipment.

FIG. 1 is a schematic illustration of an example AR system 1 which represents user-end equipment. The AR system 1 may include a display means in the form of AR glasses 20 having one or more see-through (i.e., transparent) lenses for displaying received video content by overlaying it, e.g. projecting it, onto the one or more lenses using known techniques. The term "lenses" does not necessarily imply any optical correction. The AR glasses 20 can be of any suitable type. As mentioned, a mobile phone or tablet computer may provide the same function using a camera on one side as the lens to provide a real-time image on a display on the other side.

The AR glasses 20 may receive data representing virtual content from a media player 10. In its broadest sense, the media player 10 is a processing means for handling and processing data. The media player 10 may be part of a separate device which is connected to the AR glasses 20 by a wired or wireless connection. For example, the media player 10 may include a games console, PC, laptop, digital assistant, mobile phone or tablet computer. The media player 10 may communicate with the AR glasses 20 using any wired or wireless communications method, for example using WiFi, Bluetooth or similar technologies.

Alternatively, the media player 10 may form part of the AR glasses 20.

Alternatively, the media player 10 may not be part of the user-end equipment, and may be an edge or cloud-based system that provides virtual content direct to the AR glasses 20 over a data network, such as by using cellular communications, e.g. using 3G, LTE, 4G, 5G or any similar future communications technology.

The AR system 1 may also comprise, or be associated with, one or more cameras for capturing static and/or moving images in use. For example, if the AR system 1 includes a mobile phone or tablet computer as the display means, one or more cameras may be provided which act as the lens into the real world. In the case of the AR glasses 20, one or more cameras may be mounted on the AR glasses 20, e.g., in the position indicated by reference numeral 28. Images captured by the one or more cameras 28 may be processed by the AR glasses 20 and/or may be transmitted to the media player 10 for processing.

The AR system 1 may also comprise means for determining the position of a user, for example by determining the position of the AR glasses 20 or the mobile phone or tablet computer. The term "position" may refer to a geographic location which may use global positioning techniques such as GNSS (e.g., GPS), localisation/triangulation via WiFi or cellular base-station signals, but may also refer to position with respect to a reference point and/or an orientation, e.g. of the user's head, indicative of a field-of-view (FOV). As well as determining where the user may be located in space, over successive time frames a measure of movement may be calculated and stored. Such means may comprise part of the media player 10 and/or part of the AR glasses 20 or mobile phone or tablet computer. For example, the AR glasses 20 or mobile phone or tablet computer may incorporate a GNSS receiver or may even carry a radio location tag detectable by one or more high-accuracy radiolocation readers. The AR glasses 20, mobile phone or tablet computer may comprise one or more motion tracking sensors which may include one or more of gyroscopes, accelerometers and structured light systems. These sensors may generate position data from which a current visual FOV may be determined, and which is updated as the user, and so the AR glasses 20, mobile phone or tablet change position and/or orientation.

The AR glasses 20 may comprise two see-through lenses which may incorporate respective digital displays, e.g. LED or OLED displays. Alternatively, the digital displays may be projected to the surface of the lenses, e.g. directly or via a prism, at appropriate positions.

In some embodiments, the AR system 1 may determine the position and/or orientation of the user's head using six degrees of freedom (6DoF). As shown in FIG. 1, in relation to the shown AR glasses 20, these may include measurements of pitch 22, roll 23 and yaw 24 and also translational movement in Euclidean space along side-to-side, front-to-back and up-and-down axes 25, 26, 27. In this way, it is relatively straightforward to determine the user's FOV.

In use, a user wearing the AR glasses 20, or carrying a mobile phone or tablet computer, may move within a real-world space. Depending on their position, virtual content may be displayed as one or more overlays onto the relevant display means (i.e. lens or display screen) to augment the real-world view based on said position. For example, if the position corresponds with the location of a particular monument or landmark, the media player 10 may provide virtual content relevant to that position (and therefore the monument or landmark). The virtual content may already be stored on the media player 10 or may be retrieved by sending the position information to a remote source of virtual content, i.e. a remote content provider, and then by receiving and displaying the relevant virtual content.

Figure 2:
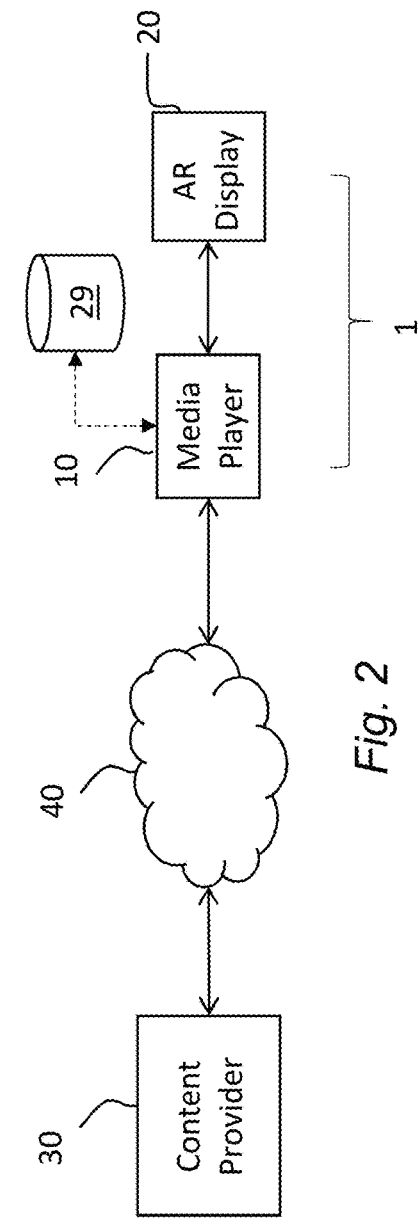
FIG. 2 is a block diagram showing functional components of an example AR system, including a content provider and network.

Referring to FIG. 2, a remote content provider 30 may store and transmit virtual content as discrete files or as a packetized or a continuous stream of data which, in the context of example embodiments, is data representing virtual content for AR overlay using the display means, e.g. AR glasses 20. Responsive to receive or download requests sent by the media player 10, the content provider 30 sends the virtual content over a data network 40, which may be any network, for example an IP network such as the Internet, or a cellular network.

A storage means 29, which can be any form of storage (solid state, magnetic, or optical) may be provided for access by the media player 10 or the AR display means. The purpose of the storage means 29 is explained later on. In overview, the storage means 29 provides a way of collecting AR virtual content and possibly captured real-world images that would have been seen by a user at a given time/location but which were not displayed due to prioritization methods described herein. The storage means 29 may be part of the media player 10 or can be an edge or cloud-based device, accessed via a network.

Figure 3:
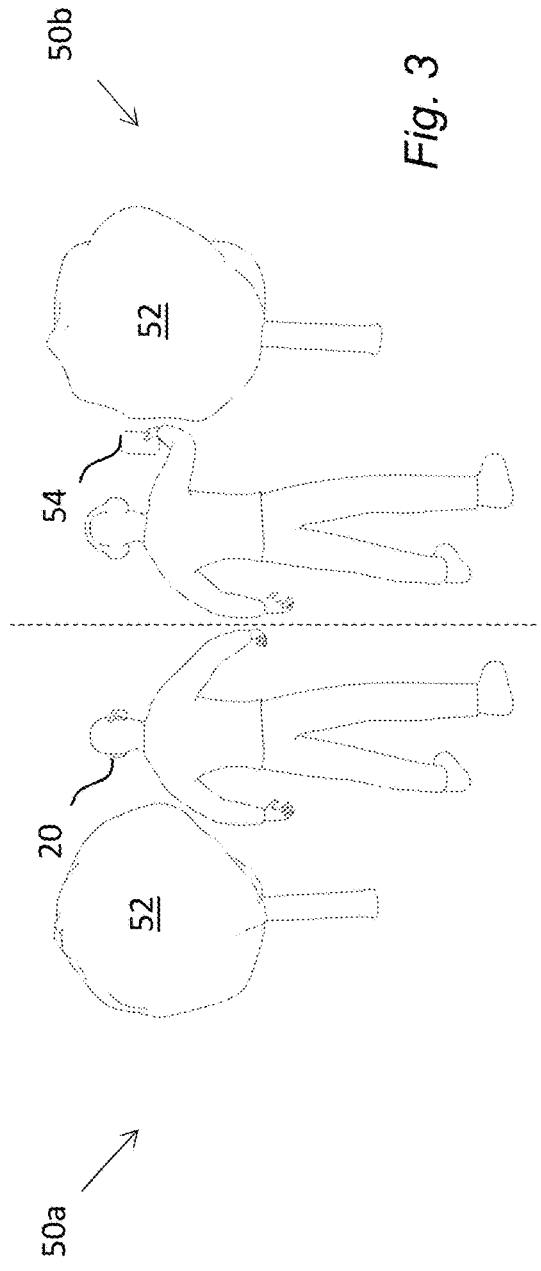
FIG. 3 is a perspective view of augmented reality scenarios which may be useful for understanding some example embodiments.

In an example use case, FIG. 3 shows in perspective view two similar scenarios 50*a*, 50*b*. In the first scenario 50*a*, a user of the AR glasses 20 shown in FIG. 1 interacts with the real-world which includes a tree object 52. In the second scenario 50*b*, a user of a mobile phone 54 positions the mobile phone in such a way that a rear camera thereof is directed towards the tree object 52 with the display screen acting with said camera as the lens equivalent. The user may or may not wear headphones or earphones/earbuds to obtain related audio data.

Figure 4A:
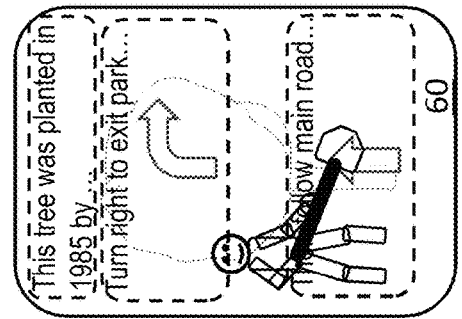
FIGS. 4a-4c are schematic views indicative of a user interface of a display means of FIG. 1.
Figure 4B:
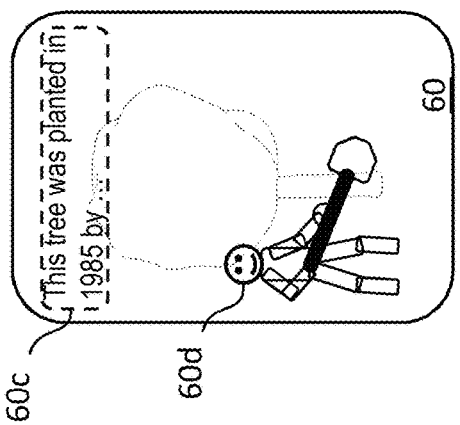
Figure 4C:
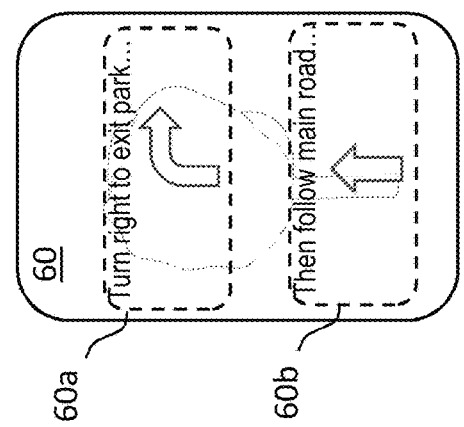

FIGS. 4*a*-4*c* are schematic views of what the user may see via a user interface 60 of the display means using the FIG. 1 AR system 1. For ease of explanation, the user interface 60 is that shown by the mobile phone 54, but the same or a similar user interface is applicable to the AR glasses 20, albeit possibly in stereoscopic or volumetric representation. The examples may relate, e.g., to simultaneous use of more than one AR service or consumption of more than one AR content from one or more sources. For example, user may utilize specific AR services that may be location-based or context-based and correspond to wide areas with suitable adaptation of the content based on user movement (e.g., navigation) and AR services that are highly location-based (e.g., local information services) with limited applicability at other physical locations.

Referring to FIG. 4*a*, the media player 10 provides a first set of virtual content 60*a*, 60*b* in the form of navigational instructions, which may be part of a navigational application to guide the user to a particular destination. The current position of the user determines the navigation instructions, i.e. what to do next. The first set of virtual content 60*a*, 60*b* in this case comprises two portions of related content intended to be displayed together at a given time and which will advance as the user changes position. However, a set of virtual content may comprise only one or more than two portions of related content. FIG. 4*b* shows a different, second set of virtual content 60*c*, 60*d* in the form of textual and image information related to the tree object 52, also based on the same or similar location of the mobile phone 54, and possibly the user's orientation. FIG. 4*c* shows how the first and second sets of virtual content 60*a*-60*d* would conflict if both were displayed on the user interface 60 at the same time. There is at least some overlap, but even the closeness (e.g. within a certain predetermined distance) and number of different virtual content portions can cause a conflict that may overwhelm, distract or confuse the user.

Example embodiments therefore aim to avoid or reduce such a problem by prioritizing one set of virtual content over another whilst collecting missed content for later re-use, or 're-living'.

FIG. 5 is a flow diagram indicative of processing operations according to an example embodiment. The operations may be performed in hardware, software, firmware or a combination thereof. A greater or fewer number of operations may be involved. The operations may be performed by, for example, the media player 10.

A first operation 5.1 may comprise providing, based on a position associated with a display means, different first and second sets of virtual content for overlaid display at the display means at a first time. The position may be that of the user, the media player 10 and/or the display means, if different from the media player. The position may be a geographic location.

A second operation 5.2 may comprise determining that the first set of virtual content is prioritized over the second set of virtual content.

A third operation 5.3 may comprise, based on the determination, prioritizing display of the first set of virtual content over the second set of virtual content at the display means and enabling display of the second set of virtual content at a second, subsequent, time.

The term "providing" may mean "receiving", e.g. from another source.

In some embodiments, prioritizing display may involve causing display of the first set of virtual content at the display means, and not the second set of virtual content. Determining that the first set of virtual content is prioritized over the second set may be based, for example, on the first set already being displayed when the second set is provided. For example, assuming the navigational instructions comprise the first set of virtual content, if said instructions are already being overlaid when the second set is provided, then the first set may be prioritized and the second set not displayed but saved or collected for display later on. Other rules for determining prioritization may be predetermined or even learned over time using, for example, machine learning or artificial intelligence methods. Examples may comprise a rule that prioritizes the most relevant virtual content over less relevant virtual content, or that which occupies the least or most space on the user interface being prioritized over the opposite situation, or by learning what types of virtual content a user selects over other types, over a prior time period.

In some embodiments, the prioritization determination may be performed in response to detecting a conflict situation if both sets of first and second virtual content were displayed at the same time. This may occur if their respective positions will be within a predetermined distance of one another or will overlap on the user interface, and/or if greater than a predetermined number of virtual object portions will occupy the user interface, and/or if greater than a predetermined percentage of the user interface will be occupied by the virtual objects.

In some embodiments, there may be a plurality of second sets of virtual content over which the first set is prioritized. For example, assuming the navigational instructions comprise the first set of virtual content, as the user follows said instructions, multiple sets of other virtual content may be provided due to the user's change in position. These multiple second sets may be collected, e.g. stored, for later viewing. The storage may use the storage means 29 shown in FIG. 2. Effectively, for a particular user or device identifier, a collection of one or more other sets of virtual content are stored, either locally or at an edge or cloud device, for later playback or re-living. This later re-living may be initiated automatically, e.g. when the first virtual content ceases to be displayed by the display means. For example, when the user reaches their destination, the navigation instructions of the first virtual content may cease and this may trigger one or more of the collected second virtual contents to be automatically displayed. These may be displayed in a particular queued order, e.g. first-in-first out, or last-in-first-out, based on closest position to the current position, or based on some other preference that may be defined by user settings.

In some embodiments, the user may themselves be informed of the availability of the collected second virtual contents via some visual, audible and/or haptic indicator, and may at any time, by user input (e.g. touch or voice commands), cause display of the first virtual content to cease to enable access and/or display to the one or more second virtual contents. In one example, a gallery view of the second virtual contents may be presented to the user interface for user selection.

In a fourth, optional operation 5.4 indicated in FIG. 5, a further operation 5.4 may be performed of causing capture, by a camera associated with the display means, of a real-world image at, or close in time to, said first time, and associating at least a segment of the captured image with the second virtual content for display of said captured image segment with the second virtual content at said second time. This operation 5.4 may be performed responsive to the second or third operations 5.2, 5.4. In this way, a relevant real-world context is captured for display with the second virtual content, making augmentation more appropriate and informative. The captured image segment may comprise a subset of pixels of the captured image, e.g. relating to a particular object, or a plurality of objects, as distinct from the entire image. The captured image or image segment may be stored with the collection of one or more other virtual contents, either locally or at an edge or cloud device, for later playback or re-living. Metadata associated with said image or image segment may also be generated and stored, e.g. to reflect the specific time and/or location of capture and/or for defining how the captured image segment is to be displayed when displayed at the display means.

Example embodiments will now be described in more detail with reference to user interface scenarios.

FIG. 6*a* shows a user interface 70 which may be displayed by a display means (e.g. AR glasses 20) in association with an apparatus, e.g. media player 10, according to some example embodiments. The user interface 70 is similar to that shown in FIG. 4*a* but in this case indicates, via a visual indicator 72, that other AR content having lower priority than the current virtual content 60*a*, 60*b* has been saved for later replay. The visual indicator 72 may be positioned anywhere in the user interface 70, and may take any form. It may be accompanied by an aural and/or haptic signal when it appears and/or is updated. It may also indicate the number of sets of virtual content that are saved in the user's collection and stored in the storage means 29. In the present case, one set of virtual content is saved as indicated by the '1' numeral.

FIG. 6*b* shows an example user interface 74 resulting from user-selection to replay the saved virtual content. The user interface 74 comprises a gallery view showing a thumbnail 76 for the set of virtual content 60*c*, 60*d* shown in FIG. 4*b*. The virtual content 60*c*, 60*d* is saved at a first time based on the user's position being proximal to the real-world tree object 52 and the virtual content having lower priority to that being currently shown. The thumbnail 76 may be selected at any time after the first time, e.g., by touch or spoken input. In other embodiments, there may be multiple thumbnails 77 representing other replayable virtual content, indicated by the dashed lines. Associated with each thumbnail 76, 77 may be metadata 78 describing associated information such as time/location of saving/capture. The user, by selecting the thumbnail 76 at a second time, may cause its associated virtual content to be replayed.

For example, with reference to FIG. 6*c*, selecting the thumbnail 76 may cause the associated virtual content 60*c*, 60*d* to be shown on the user interface 70. Note that the virtual content 60*c*, 60*d* may be overlaid onto the current real-world scene 79 that, in this case, differs from the scene at the time of capture because the user has changed position. Nevertheless, the user is able to replay the virtual content 60*c*, 60*d* whilst avoiding screen conflict.

As previously mentioned, improved context may be provided by saving a snapshot of the real world scene that was seen at the time, or close in time, to when said virtual content was saved for reply. This snapshot may comprise one or more images or image segments, possibly even a short period of captured video and/or audio.

For example, the scene comprising the tree object 52 in FIG. 3 may have been captured at said time, and the tree object 52 saved as an image segment to be overlaid also with the saved virtual content 60*c*, 60*d* at the time of replay. The result of the replay is shown in FIG. 6*d*, where an image segment 80 representing the tree object 52 is shown overlaid over the current scene with the virtual content 60*c*, 60*d* which further improves context.

In some example embodiments, a user may wish to replay or relive saved virtual content based on their current real world surroundings. For example, a similarity between said captured image segment, such as the captured and segmented tree object 80, and part of a current or recent real-world image captured by the camera, may be used. The media player 10 may cause display of said captured image segment, e.g. the image segment 80, at the display means in response to determining a predetermined level of similarity with, for example, a tree that is currently or recently in view.

Determining similarity may use any suitable and known image processing algorithm. Known examples include, for example, using sum square distance, Mahalanobis distance, hamming distance, cross-correlation, convolutional neural networks and so on. A predetermined distance threshold may be predefined, and possibly modified using software user settings, to set the degree of similarity required.

Figure 7C:
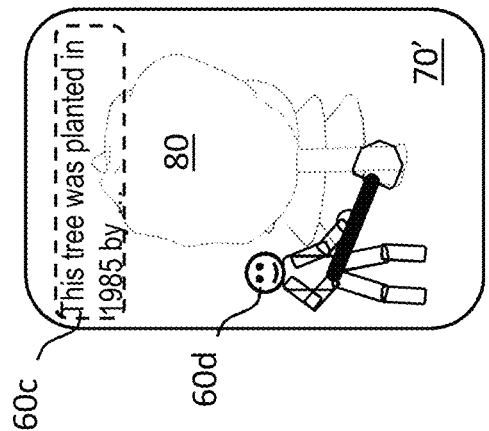
FIGS. 7a-7c are schematic views indicative of a user interface of a display means operating according to some example embodiments.
Figure 7B:
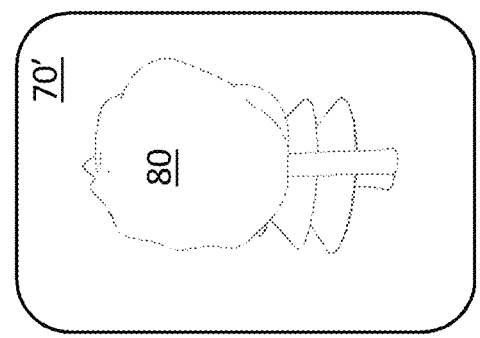
Figure 7A:
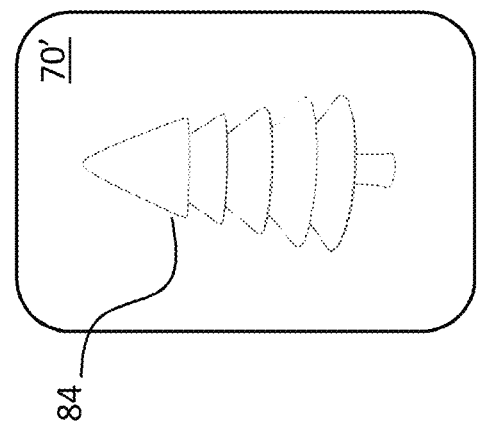

In such cases, and as shown in FIGS. 7*a*-7*c*, responsive to identifying an object 84 in the user's FOV, the media player 10 may determine that it has a predetermined similarity to the image segment 80 (e.g. greater than 70%) and hence determines to overlay the image segment 80 at a position of the user interface 70' corresponding to the object 84 (FIG. 7*b*). If the user moves their FOV, the position of the image segment 80 may track accordingly to remain overlaid on the object 84. As shown in FIG. 7*c*, the overlay of the relevant virtual content 60*c*, 60*d* completes the augmentation.

In some example embodiments, we consider cases where the similar part of the current or recent real-world image, e.g., object 84, is outside of a predetermined display region of the display means. This may comprise the object 84 being completely or partially out of the display means' display or capture region. Responsive thereto, the media player 10 may provide one or more cues via the display means indicating a required camera movement to capture said similar part of the current or recent real-world image. The cue may be visual, aural and/or haptic. The cue may indicate a direction and/or degree of movement in said direction. In this way, a user may be directed to make one or more further inputs, e.g. positional changes, to cause the media player 10 to replay or relive the virtual content. For example, the one or more cues may change appearance with movement of the camera to indicate progress towards the required orientation.

Figure 8:
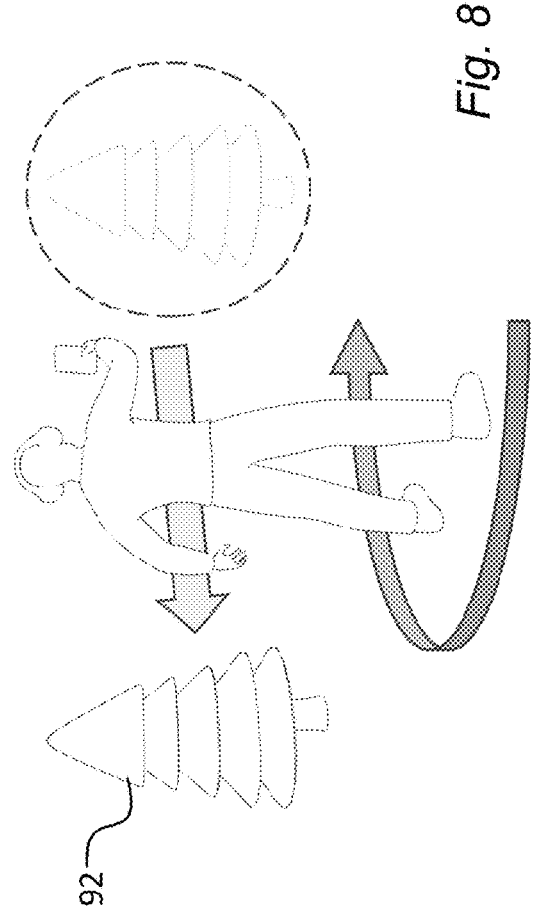
FIG. 8 is a schematic view of an augmented reality scenario which may be useful for understanding some example embodiments.
Figure 9C:
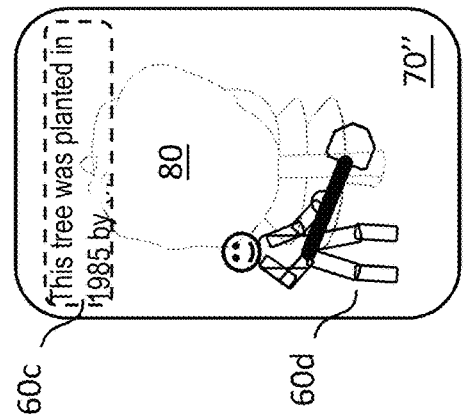
FIGS. 9a-9c are schematic views indicative of a user interface of a display means operating according to some example embodiments.
Figure 9B:
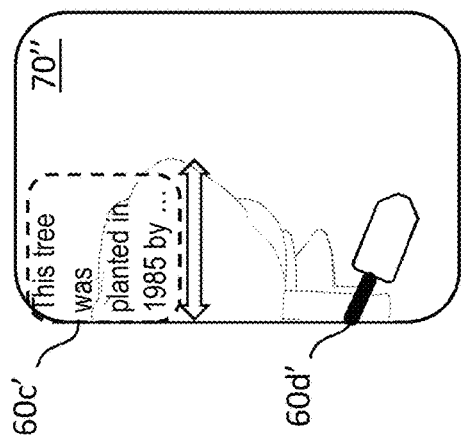
Figure 9A:
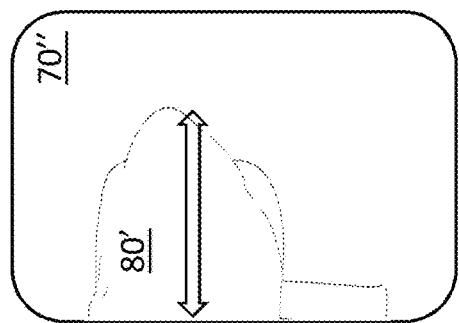

FIG. 8 shows a situation in which the user has rotated rightwards so that a previously-captured image of an object 92 is no longer in the capture region. FIGS. 9*a*-9*c* show progression of an example visual cue for indicating in real-time how the user should move in order to trigger playback of stored virtual content relevant to the location. In FIG. 9*a*, part of a image segment 80' is shown to the left-hand side of a user interface 70" to indicate that movement towards the left-hand direction will trigger display of some virtual content. The image segment 80' is shown stretched, or otherwise distorted in some way, to indicate the amount of movement needed. Note that a modified form of the image segment 80' is used in this case, but it could also or alternatively include a modified form of the associated virtual content itself. For example, as shown in FIG. 9*b*, as the user begins to move their mobile phone 54 leftwards, more of the image segment 80' emerges into the user interface 70" but with less distortion. Also, at least some of the virtual content 60*c*', 60*d*' begins to appear. FIG. 9*c* shows when the correct amount of movement has been reached, whereby the captured image (image segment 80) is shown overlaid with the virtual content 60*c*, 60*d* as was the case for FIG. 7*c*. The un-stretching of the image segment 80' with movement of the mobile phone 54 indicates progress towards the predetermined display region to guide the user with continual feedback. Where at least some of the virtual content 60*c*', 60*d*' is also shown, this may expand either in terms of amount of content (e.g., words) or size.

In some example embodiments, prioritization may allow two sets of virtual content to appear simultaneously, but with one set of virtual content shown with more prominence over the other. For example, FIGS. 10*a*-10*c* follow-on from the above-mentioned example. In this case, if the first set of virtual content 60*a*, 60*b* is being displayed, movement of the mobile phone 54 leftwards causes it to shrink in size on the user interface 70''' in sympathy (possibly at the same or at a different rate) with the expansion of the second set of virtual content 60*c*, 60*d*. FIG. 10*b* shows the user interface 70''' as the user progresses leftwards, where it is seen that the first set of virtual content 60*a*' 60*b*' begins to shrink and part of the second set of virtual content 60*c*', 60*d*' begins to emerge. FIG. 10*c* shows the user interface 70''' when the correct amount of movement has been reached, similar to FIG. 9*c*, although a minimised version 60*a*'' of at least some of the first set of virtual content 60*a* remains. In some embodiments, the first set of virtual content 60*a* may be entirely removed, leaving only the second set of virtual content 60*c*, 60*d*.

In some example embodiments, a distinction may be made between saved virtual content that can be displayed (based on current or recently captured images or image sections, as for FIGS. 7-10) and saved virtual content which is not associated with any current or recently captured images of a current or recent position, i.e. unrelated to the current position or surroundings. In such cases, two different forms of indicator 72', 72" may be provided on a user interface 70"" as shown in FIGS. 11*a*-11*c*.

A first type of indicator 72' may be indicative of the availability, and possibly the number of sets of virtual content that can be consumed at any time responsive to user selection. Selection thereof may take the user to the gallery view shown in FIG. 6*b*, for example.

A second type of indicator 72" may be indicative of the availability, and possibly number, of sets of virtual content that can be consumed now, with the additional context provided by any of the FIGS. 7-10 embodiments. For example, the second type of indicator 72" may indicate the direction and amount of positional change required, e.g. via position, size and/or distortion, to arrive at the correct position indicated in FIG. 11*c*.

Further, more than one second type of indicator 72" may be used to indicate respective other virtual contents that can be replayed or re-lived by moving in different respective directions. For example, in addition to the second type of indicator 72" on the left-hand side of the user interface 70"", there may be another second type of indicator (not shown) on the right-hand side of the user interface.

Any or all of the above-described operations and embodiments may be performed in the background so that the user is unaware of the processing being performed, save for cases where indication is made via visual, aural and/or haptic feedback. Virtual content and associated data that is stored on memory means 29 may be deleted automatically when consumed, after a predetermined period of time and/or when a user's position has moved to a sufficiently distant location for a predetermined period of time. Alternatively, or additionally, said virtual content and associated data could be compressed and stored in cloud storage after consumption or after a predetermined period of time. Said virtual content may be shared with other users in some embodiments.

In some example embodiments, a determination may be made whether to overlay captured images or image segments based on relevance to the virtual content. For example, staying with trees, virtual content might be about the specific tree at the relevant position. The virtual content might specify when the specific tree was planted and by whom. In this case, it might be important to show also the captured image of particular tree. On the other hand, the virtual content could be generic, e.g. about nature conservation, in which case, the segmented object photo overlay may appear less pronounced or not be directly used for the visual presentation (and thus only content matching purposes). Such information on the importance or relevance of an object may be derived from metadata that is part of the virtual content or it may be derived, e.g., based on AI analysis of textual and/or audio content.

Figure 12:
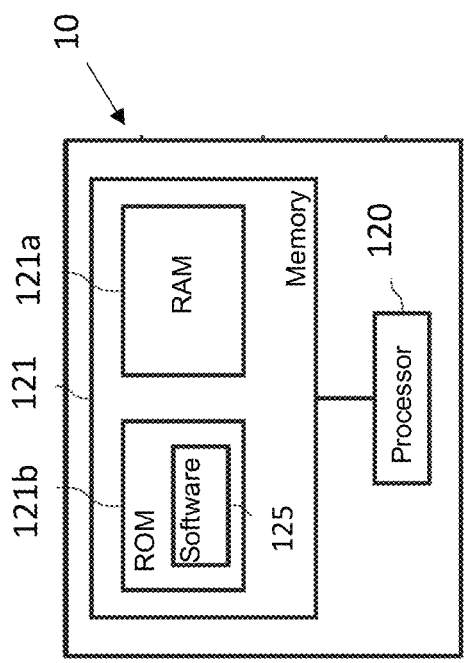
FIG. 12 is a schematic view showing functional components of an apparatus according to some example embodiments.

FIG. 12 shows an apparatus according to an embodiment, which may comprise the media player 10 as described herein. The apparatus may be configured to perform the operations described herein, for example operations described with reference to any preceding process. The apparatus comprises at least one processor 120 and at least one memory 121 directly or closely connected to the processor. The memory 121 includes at least one random access memory (RAM) 121*a* and at least one read-only memory (ROM) 121*b*. Computer program code (software) 125 is stored in the ROM 121*b*. The apparatus may be connected to a transmitter (TX) and a receiver (RX). The apparatus may, optionally, be connected with a user interface (UI) for instructing the apparatus and/or for outputting data. The at least one processor 120, with the at least one memory 121 and the computer program code 125 are arranged to cause the apparatus to at least perform at least the method according to any preceding process. The at least one processor 120 may be in communication with the AR glasses, goggles, mobile phone or tablet computer described herein.

Figure 13:
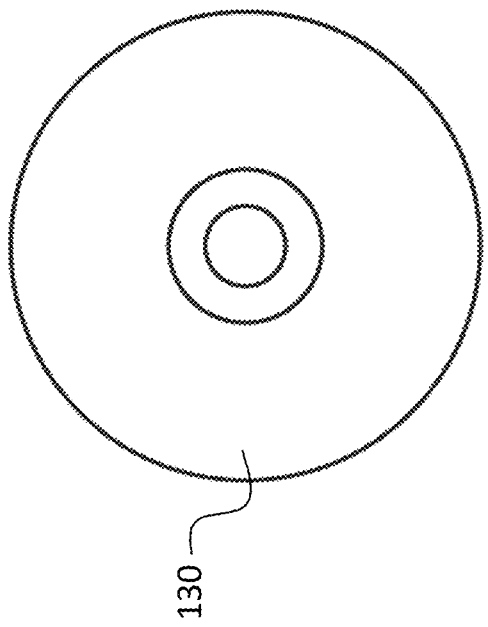
FIG. 13 is a plan view of a non-transitory media for storing computer-readable code for performance of some example embodiments.

FIG. 13 shows a non-transitory media 130 according to some embodiments. The non-transitory media 110 is a computer readable storage medium. It may be e.g. a CD, a DVD, a USB stick, a blue ray disk, etc. The non-transitory media 130 stores computer program code, causing an apparatus to perform the method of any preceding process.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures.

The invention claimed is:

1. An apparatus comprising:
   at least one processor; and
   at least one memory including computer program code,
   the at least one memory and the computer program code configured to, with the at least one processor, cause the apparatus to perform at least the following:
   providing, based on a position associated with a display, different first and second sets of virtual content for overlaid display at the display at a first time;

determining that the first set of virtual content is prioritized over the second set of virtual content;
based on the determination:
prioritizing display of the first set of virtual content over the second set of virtual content at the display;
causing display of an indicator, via the display, that the second set of virtual content has been saved for later replay; and
enabling display of the second set of virtual content at a second, subsequent, time.

2. The apparatus of claim 1, wherein the prioritizing display of the first set of virtual content over the second set of virtual content at the display comprises causing display of the first set of virtual content at the display at the first time, and not the second set of virtual content.

3. The apparatus of claim 1, wherein the apparatus is further caused to determine that the first set of virtual content is prioritized over the second set of virtual content if the first set of virtual content is being displayed prior to the first time.

4. The apparatus of claim 1, wherein the apparatus is further caused to determine that the first set of virtual content is prioritized over the second set of virtual content if the first and second sets of virtual content will conflict if both are displayed at the first time.

5. The apparatus of claim 4, wherein the apparatus is further caused to identify that the first and second sets of virtual content will conflict if their respective positions will be within a predetermined distance of one another or will overlap.

6. The apparatus of claim 1, wherein enabling display of the second set of virtual content at the second time comprises enabling display of the second set of virtual content automatically, responsive to the first set of virtual content no longer being displayed.

7. The apparatus of claim 1, wherein enabling display of the second set of virtual content at the second time comprises enabling display of the second set of virtual content responsive to receiving a user-selection of the second set of virtual content.

8. The apparatus of claim 1, wherein the apparatus is further caused to cause capture, by a camera associated with the display, of a real-world image at, or close in time to, the first time, and to associate at least a segment of the captured image with the second virtual content for display of at least the segment of the captured image with the second virtual content at the second time.

9. The apparatus of claim 8, wherein, subsequent to the first time, the apparatus is further caused to determine a similarity between the at least the segment of the captured image, and part of a current or recent real-world image captured by the camera, and to cause display of the captured image segment at the display in response to determining at least a predetermined level of similarity.

10. The apparatus of claim 9, wherein the apparatus is further caused to cause display of the captured image segment such that it overlays the similar part of the real-world image.

11. The apparatus of claim 9, wherein the apparatus is further caused to identify that a similar part of the current or recent real-world image is outside of a predetermined display region of the display, and responsive to the identification, is caused to provide one or more cues via the display indicating a required camera movement to move the similar part of the current or recent real-world image towards the predetermined display region.

12. The apparatus of claim 11, wherein the one or more cues change appearance in response to movement of the camera to indicate progress towards the predetermined display region.

13. The apparatus of claim 12, wherein the apparatus is further caused to provide at least one of a modified form of the second set of virtual content or the captured image segment as the cue.

14. A method, comprising:
providing, based on a position associated with a display, different first and second sets of virtual content for overlaid display at the display at a first time;
determining that the first set of virtual content is prioritized over the second set of virtual content;
based on the determination:
prioritizing display of the first set of virtual content over the second set of virtual content at the display;
causing display of an indicator, via the display, that the second set of virtual content has been saved for later replay; and
enabling display of the second set of virtual content at a second, subsequent, time.

15. The method of claim 14, wherein the prioritizing display of the first set of virtual content over the second set of virtual content at the display comprises causing display of the first set of virtual content at the display at the first time, and not the second set of virtual content.

16. The method of claim 14, further comprising determining that the first set of virtual content is prioritized over the second set of virtual content if the first set of virtual content is being displayed prior to the first time.

17. The method of claim 14, further comprising determining that the first set of virtual content is prioritized over the second set of virtual content if the first and second sets of virtual content will conflict if both are displayed at the first time.

18. The method of claim 17, further comprising identifying that the first and second sets of virtual content will conflict if their respective positions will be within a predetermined distance of one another or will overlap.

19. The method of claim 14, wherein enabling display of the second set of virtual content at the second time comprises enabling display of the second set of virtual content automatically, responsive to the first set of virtual content no longer being displayed.

20. A non-transitory computer readable medium comprising program instructions stored thereon for performing at least the following:
providing, based on a position associated with a display, different first and second sets of virtual content for overlaid display at the display at a first time;
determining that the first set of virtual content is prioritized over the second set of virtual content;
based on the determination:
prioritizing display of the first set of virtual content over the second set of virtual content at the display;
causing display of an indicator, via the display, that the second set of virtual content has been saved for later replay; and
enabling display of the second set of virtual content at a second, subsequent, time.

* * * * *